Nov. 30, 1937.  E. E. FORRESTER  2,100,438
METHOD FOR MAKING STOP COCKS
Filed Aug. 10, 1936  2 Sheets-Sheet 1
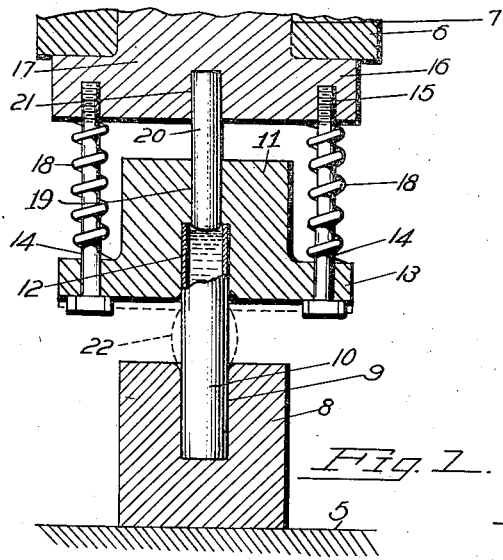
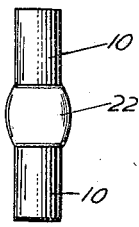
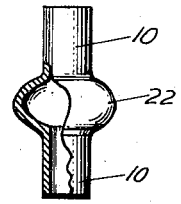
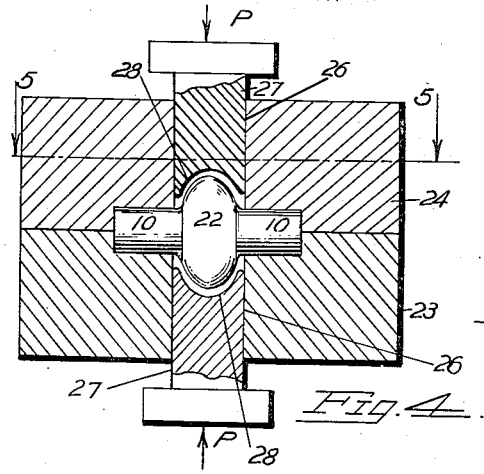
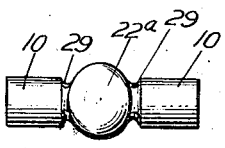
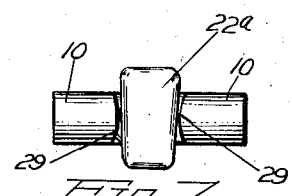
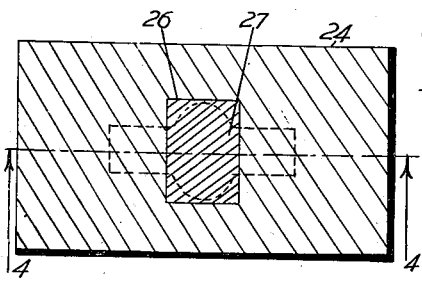
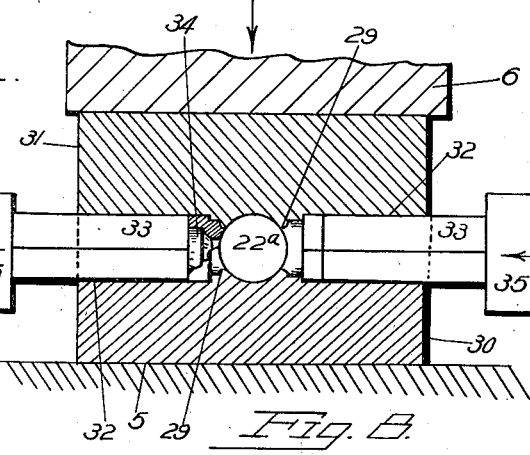
INVENTOR.
EDWARD E. FORRESTER
BY
ATTORNEY.

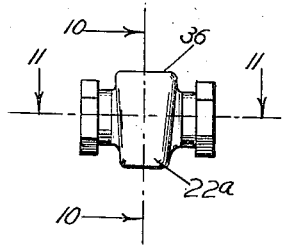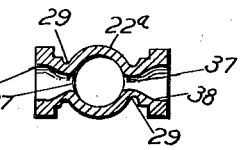
Fig.9.  Fig.10.  Fig.11.
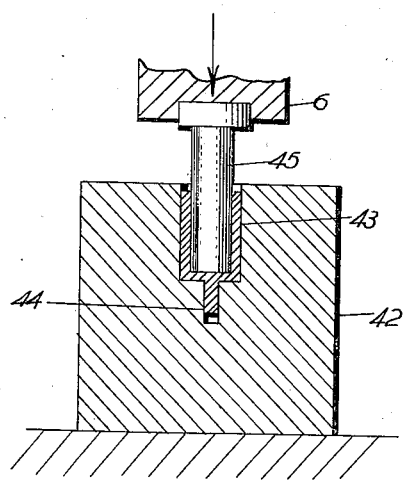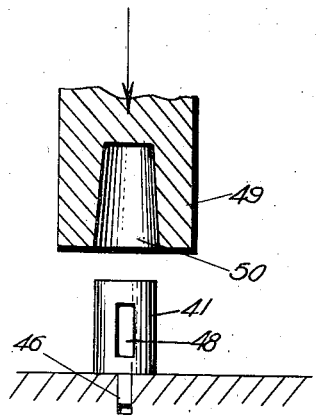
Fig.12.  Fig.13.
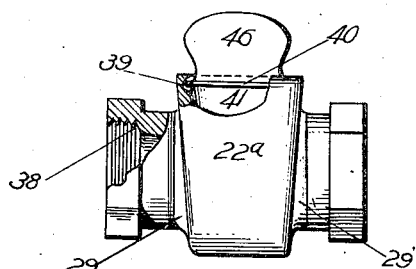
Fig.14.
INVENTOR.
EDWARD E. FORRESTER
BY
ATTORNEY.

Patented Nov. 30, 1937

2,100,438

UNITED STATES PATENT OFFICE 2,100,438

METHOD FOR MAKING STOP COCKS

Edward E. Forrester, Denver, Colo.; Irene Forrester executrix of Edward E. Forrester, deceased Application August 10, 1936, Serial No. 95,149

2 Claims. (Cl. 29—157.1)

This invention relates to improvements in methods for making stop cock bodies from tubular brass stock and similar ductile material, by a combination of hydraulic and mechanical pressure.

Stop cocks, in connection with the manufacture of which the method will be explained, are manufactured and sold in large numbers, and the bodies are usually cast in sand molds. Brass castings frequently have blow holes, and in practically every case, sand adheres to the surfaces of the castings so tenaciously that some remains after the tumbling operation to which they are subjected. The blow holes spoil the castings for the use for which they are intended, and result in a high percentage of spoilage. In many cases the blow holes are not discovered until the stop cocks have been finished, and the labor expended is therefore wasted.

Stop cocks have a tapered opening for the reception of a correspondingly tapered plug, and these openings must be reamed before the plug can be inserted. It often happens that particles of sand adhering to the surface of the casting get caught by a reamer tooth, and embeds itself therein, with the result that the opening, instead of being smooth, has one or more grooves cut by the sand.

The sand also nicks the teeth of the reamer and the latter must therefore be reground before it can again be employed.

Castings are, moreover, weaker than cold forgings, and due to the objections pointed out, are subject to a high percentage of spoilage.

It is the principal object of this invention to provide a method by which bodies for stop cocks and other articles of a similar nature, can be formed from hollow brass tubing by means of steel dies, and a combination of direct mechanical pressure and hydraulic pressure applied to the cold metal.

Another object is to provide a method by which a tubular ingot can be bulged outwardly by a combination of pressure directly applied to its ends, and liquid pressure applied to its inside in such a way that the bulged portion will retain its original thickness, and can even be made thinner than the original wall thickness.

Another object of this invention is to provide a method of making hollow bodies, such as stop cock bodies, having intersecting openings, without the use of piercing tools or heat.

A further object is to produce a stop cock body in which the material is highly condensed and therefore absolutely free from openings through which fluid may pass, and which will be very strong and tough.

The method, briefly described, consists in progressively changing the shape of a tubular ingot of brass or other ductile material, by placing it in specially formed dies of steel, and simultaneously applying pressure to the ends of the ingot by means of plungers and subjecting the interior to hydraulic pressure of sufficient value to force the material outwardly against the sides of the die, whereby it will assume a shape in exact conformity with the die and will always remain hollow.

The stop cocks and the method by which they are formed will now be described in detail, and for this purpose, reference will be had to the accompanying drawings in which the different steps of the method have been illustrated, and in which Figure 1 is a section through a "bulging" die, showing the tubular billet from which the stop cock body is to be made, in place therein;

Figure 2 shows the shape of the billet after the first step of the method;

Figure 3 shows the billet after it has been annealed and subjected to a second and final bulging operation;

Figure 4 is a section taken on line 4—4, Figure 5 and shows the billet, illustrated in Figure 3, in position to be acted on by opposed plungers to change the shape of the enlarged central portion;

Figure 5 is a section taken on line 5—5, Figure 4;

Figure 6 is a side view of the billet after it has been subjected to a forming operation in the dies shown in Figures 4 and 5;

Figure 7 is a top plan view of the billet shown in Figure 6;

Figure 8 is a section through the last forming die;

Figure 9 is a side elevation of the stop cock body after it has been removed from the die shown in Figure 8.

Figure 10 is a transverse section taken on line 10—10, Figure 9;

Figure 11 is a longitudinal section taken on line 11—11, Figure 9;

Figure 12 is a section through a die showing the first step in forming the plug;

Figure 13 shows a section through the die used for tapering the plug; and

Figure 14 is a side elevation of the complete stop cock, a portion being broken away to better disclose the construction.

In the drawings numeral 5 designates the base or table of a press, preferably a hydraulic press, and 6 the plunger, which has a central opening 7.

The die, by means of which the first step is performed, comprises a member 8 that rests on the upper surface of the press table and is provided with a cylindrical opening 9 for the reception of the lower end of a tubular brass billet 10, which contains the amount of metal required for the stop cock body. The other part of this tool consists of a die 11 having an opening for the reception of the upper end of the billet 10. Die 11 is provided with a circular flange 13 having three or more radially spaced openings for the reception of the bolts 14, whose upper ends are threadedly connected with openings 15 in the flange 16 of the anvil 17 that extends into opening 7 in plunger 6.

The upper surface of the flange 16 seats against the under surface of the plunger. Springs 18 surround the bolts 14 and normally hold the parts in the position shown in Figure 1. Die 11 is also provided with an opening 19, concentric with opening 12, and somewhat smaller in diameter than the opening in the billet 10. A plunger 20 is slidable in opening 19, and has its upper end secured in an opening 21 in the anvil 17. Plunger 20 fits the opening 19 very closely, so as to prevent leakage and when the parts are in the position shown, the plunger 20 projects slightly into opening 12.

For the first expanding operation the tubular and cylindrical billet 10 is first positioned in opening 9 in the die 8, and filled with oil. The upper end is then inserted in opening 12 in die 11. The plunger 6 is now moved downwardly and compresses the springs 18 which exert pressure forcing the bottom of hole 12 into sealing contact with the upper end of the tubular billet.

When the anvil 17 moves downwardly relative to the die 8, the plunger 20 is moved into the tubular member and displaces an equal volume of oil, thereby putting the oil under great pressure. When the anvil comes into contact with the upper end of the die 11, further movement of the plunger will result in a corresponding movement of die 11, and a compression of the billet 10 in the direction of its length. As the billet is shortened, the oil will be put under still greater pressure, with the result that the billet will bulge outwardly as indicated by dotted lines 22. The amount of this bulge for a given compression of the billet 10 depends on the diameter of the plunger 20. After the press plunger has moved a predetermined distance, the press is reversed and the billet 10, which has now attained the shape shown in Figure 2, is removed and annealed. Since the material will not stand to be expanded, in one operation, the amount necessary, the billet is subjected to a second operation, after it has been annealed, and this gives it the shape shown in Figure 3.

The billet shown in Figure 3 is now placed between the dies 23 and 24 that have a recess shaped to receive it. Dies 23 and 24 have rectangular openings 26 in which the plungers 27 are mounted. The inner ends of the plungers are transversely concave, as indicated by numeral 28.

The assembly shown in Figure 4 is now placed in a press and the plungers 27 subjected to forces P that move them inwardly at the same speed, and thereby change the circular bulged portion 22 into a transversely elongated tapered portion 22a. The sides are also pressed inwardly as indicated at 29, so as to form the port openings.

The billet after it has attained the shape shown in Figures 6 and 7, is then ready for the final forming operation and is placed in a cavity between the die blocks 30 and 31, Figure 8. The central portion 22a occupies a correspondingly shaped recess, and the ends 10 extend into the hexagonal openings 32. The dies with the billet in place therein are placed on the table 5 of a hydraulic press, and forced toward it by the action of the plunger 6.

Before the die is put into the press the plungers 33 are put into position and the interior of the billet filled with oil. The plungers 33 have their inner ends provided with cylindrical plugs 34.

The press is preferably constructed specially for this purpose and has two horizontal opposed and axially alined plungers 35 that can be moved toward each other at the same speed and these engage the ends of plungers 33 and move them inwardly with a force sufficient to cause the metal to flow and fill the cavity in the die. The oil in the body is subjected to very high pressure, and forces the metal outwardly at the same time that it is compressed endwise by the plungers, and as a result, a hollow valve body is formed that corresponds in every particular to the shape of the cavity in the dies.

The press employed for making a three-quarter inch stop cock body is capable of exerting a pressure of seventy tons against the plungers 33 and this enormous pressure transmitted to the metal of the body by the plungers and the oil, flows the metal and makes it conform to every detail of the cavity.

After the billet has been subjected to the last described forming operation it has the shape shown in Figures 9, 10 and 11 and is ready for the small amount of machining necessary to make it a stop cock body.

The end 36 is removed, as by a drill, after which the interior of the plug chamber is reamed by a tapered reamer. Since there is no sand or grit adhering to the surface of the plug chamber, the reamer cannot be damaged and the operation is quickly performed.

The ports 37 are formed during the forming operation when the depressions 29 are formed. The ends 38 are reamed and threaded as shown in Figure 14.

The inner surface of the plug chamber is provided with a groove 39 whose wall tapers upwardly, and which receives a spring ring 40.

The plug 41 can be made in any suitable way, but is preferably made in a die 42 like that shown in Figure 12. This die is provided with a cylindrical cavity 43 whose diameter corresponds to the maximum diameter of the finished plug. A narrow recess 44 extends downwardly from the bottom of the cavity. A plunger 45 has its upper end fastened to the plunger 6 of a press and the parts are adjusted so that the plunger is axially alined with the opening 43. A billet of heated brass is now dropped into the cavity and the plunger moved inwardly into the recess, whereupon the hot brass assumes the shape shown in section in Figure 12. The part in the diametrical recess 44 forms the handle 46 of the plug.

Ports 48 are now cut in the plug wall, and the latter subjected to a forming action by means of a die 49 having a tapered opening 50. The size and the taper of the opening 50 is such that the plug will fit the opening in the body of the cock. This correspondence can be effected by employing the same reamer for the tapered opening in the body and for the opening 50 in the die.

The spring ring 40 rests on the shoulder on the outer end of the plug, and presses outwardly against the tapered side of the groove 39, which produces a resultant force tending to force the plug into the opening in the body.

Although other similar articles, such as, pipe-fittings, crosses and tees can be made by this method, it has been described in connection with the production of stop cock bodies as these present a difficult problem, and have a shape that it is difficult to make except by molding or by methods employing hot metal and piercing tools.

A reference to Figs. 6 and 7 shows how the body at this stage resembles a cross and if the center piece 22a is reduced in length on one side the article will be a tee. It is therefore apparent that the method can be employed in the manufacture of pipe fittings as well as stop cock bodies.

Since this method subjects the material to very high pressures and stresses, the resultant product is dense and tough. The strength of the material in the finished product is more than twice that of cast brass.

Since there are no blow holes, and since there is no sand to interfere with the operation of the reamer, there is practically no spoilage, and if any, it is due entirely to accident.

Attention is called in particular to the fact that in carrying out this method the metal is shaped or formed while cold, which simplifies the operation very much and produces a tougher product than would be obtained if the metal were formed while hot.

Having described the invention, what is claimed as new is:—

1. The method of making a stop cock body from a tubular member of ductile metal comprising the steps of expanding a section of the tubular member at substantially its middle portion to produce a circular enlargement concentric with the member, subjecting the circular enlargement to deforming pressure on diametrically opposite points for changing the enlargement to a transversely extending tapered chamber substantially circular in a plane perpendicular to the axis of the tubular member, confining the member in a die having a cavity of the size and shape of the body desired, inserting into and against the ends of the member shape forming plugs, thereby subjecting the ends to a compressive pressure producing a stress beyond the elastic limit of the metal whereby the body will be shortened, the wall thereof thickened and forced against the outside of the plugs and simultaneously therewith subjecting the interior of the member to a hydraulic pressure producing a stress beyond the elastic limit of the metal whereby the body will be expanded and forced against the inside of the cavity to assume the shape of the latter and whereby the inside of the member will be given a shape conforming to the shape of the plugs.

2. The method of making a hollow body from a tubular member of ductile metal, comprising the steps of, expanding a section of the tubular member at a point between its ends to produce an enlargement, subjecting the enlargement to a deforming pressure for changing its shape, confining the member in a die having a cavity of the size and shape of the finished body desired, inserting into and against the ends of the member shape forming plugs, thereby subjecting the ends to a compressive pressure producing a stress beyond the elastic limit of the metal whereby the body will be shortened, the wall thereof thickened and forced against the outside of the plugs, and simultaneously therewith subjecting the interior of the member to a hydraulic pressure producing a stress beyond the elastic limit of the metal, whereby the body will be expanded and forced against the inside of the die cavity to assume the shape of the latter and whereby the inner surface of the member will be given a shape corresponding to the shape of the plugs.

EDWARD E. FORRESTER.